Feb. 9, 1943.  A. G. GURRIES  2,310,284
FRONT END LOADER
Filed Nov. 19, 1940  3 Sheets-Sheet 1
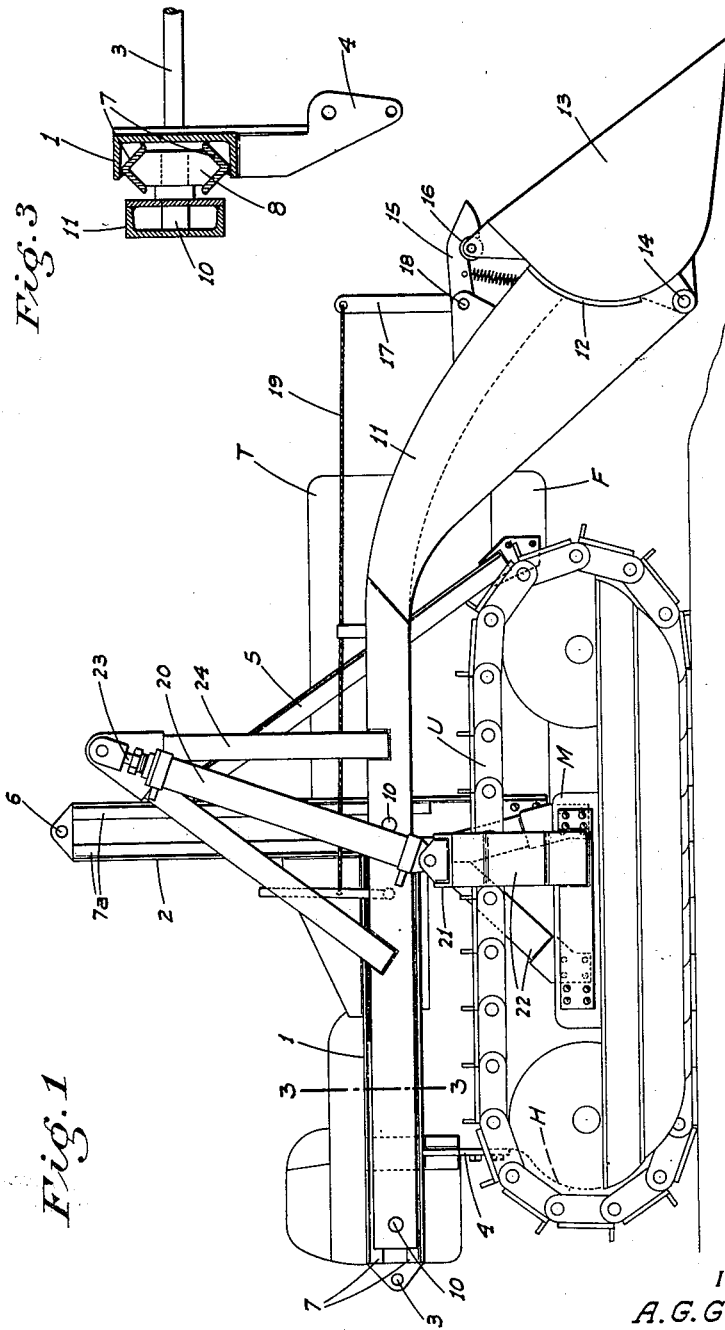
INVENTOR.
A. G. Gurries
BY
Webster & Webster
ATTORNEYS

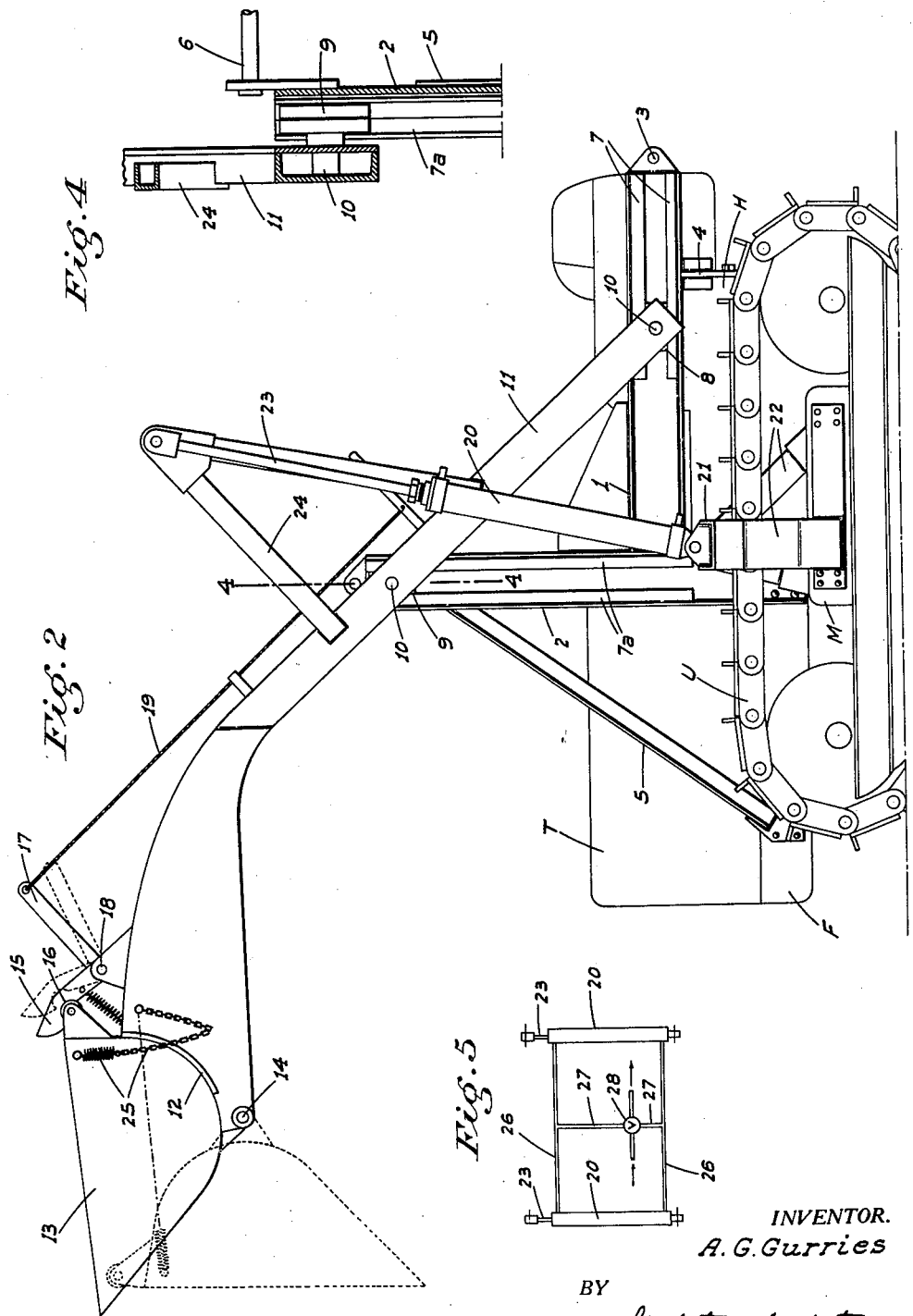

Feb. 9, 1943.   A. G. GURRIES   2,310,284
FRONT END LOADER
Filed Nov. 19, 1940   3 Sheets-Sheet 3
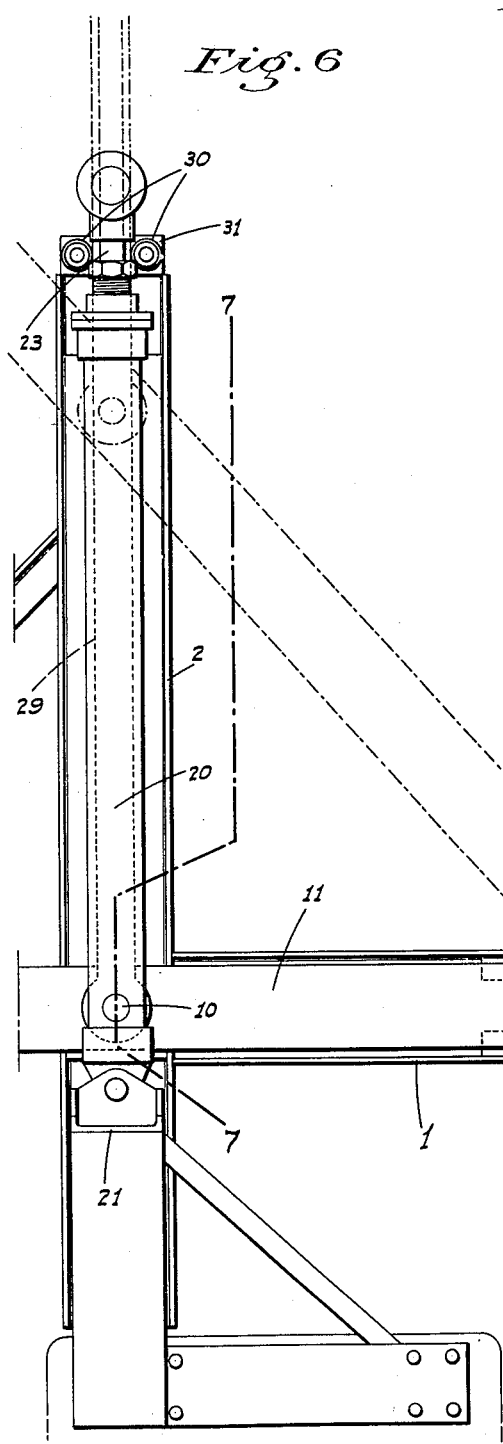
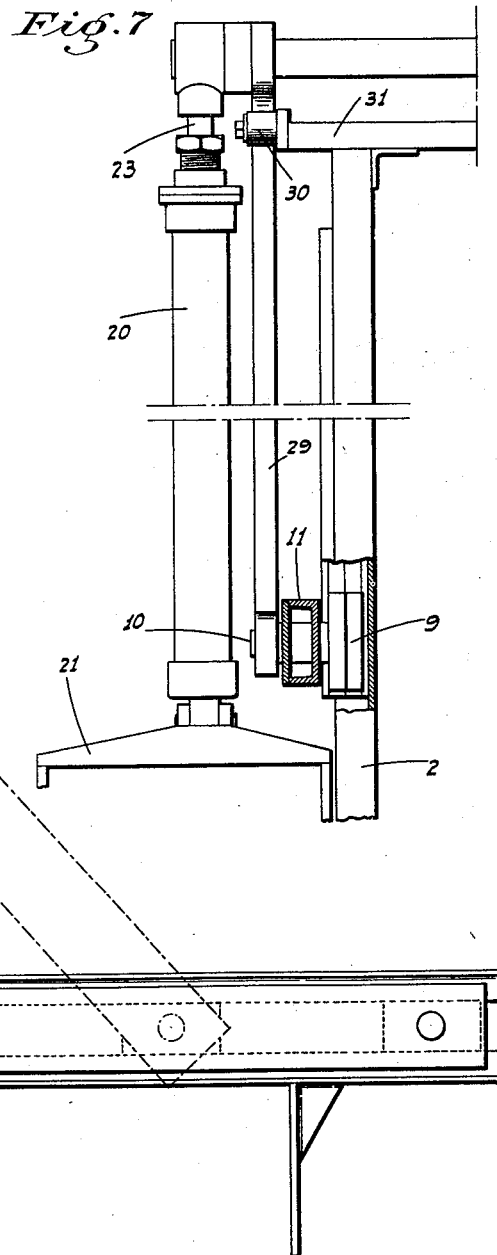
INVENTOR.
A. G. Gurries
BY
Webster & Webster
ATTORNEYS Patented Feb. 9, 1943

2,310,284

UNITED STATES PATENT OFFICE 2,310,284

FRONT END LOADER

Albert G. Gurries, Gilroy, Calif.

Application November 19, 1940, Serial No. 366,222

9 Claims. (Cl. 214—140)

This invention relates to front-end dirt and material loaders adapted to be mounted on and operated from a tractor, and by means of which a load may be picked up from adjacent ground level, elevated and discharged into a truck or the like.

The principal objects of my invention are to provide an implement of this character having mounting and control means so arranged that the bucket moves in almost a straight vertical path from top to bottom of its movement; unobstructed visibility for the operator is had, and an excess of weight in front of the tractor, and which tends to tip it and lessen its load lifting capacity, is avoided.

The loader is designed for mounting on an endless track tractor, and a further object is to arrange the implement so that it may be mounted on such a tractor without change thereto.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of one form of the loader as in lowered position and mounted on a tractor.

Figure 2 is a similar view showing the loader elevated, looking at the opposite side.

Figure 3 is a fragmentary enlarged cross section on line 3—3 of Fig. 1.

Figure 4 is a similar view on line 4—4 of Fig. 2.

Figure 5 is a diagram illustrating one form of piping arrangement between the two hydraulic operating cylinders.

Figure 6 is a fragmentary side element showing a different boom control arrangement.

Figure 7 is a fragmentary transverse section on line 7—7 of Fig. 6.

Referring now more particularly to the characters of reference on the drawings, the tractor T to which my loader is applied includes a unitary combination chassis frame F, and a rear mechanism housing H, and endless track units U each including side frame members M.

The loader as shown in Figs. 1 and 4 comprises a supporting and guiding structure which includes horizontal beams 1 disposed at the sides of the tractor above and laterally inward of the tracks and extending forwardly some distance from the rear end of the tractor, and vertical beams 2 rigid with beams 1 at their forward end and projecting both above and below the same, beams 2 being disposed substantially midway of the length of the tractor. The beams 1 are tied to each other at the back by a cross tie rod 3, and to the rear end of housing H by depending brackets 4 bolted thereon.

The beams 2 are secured at their lower end on the chassis frame F, and are tied to said frame at its forward end by diagonal brace members 5. Beams 2 may also be connected at the top by a cross tie rod 6 which if used is the only element in the line of vision of the tractor operator seated rearwardly of beams 2.

Beams 1 and 2 are of outwardly facing channel form, and secured therein at top and bottom in facing relation are longitudinal angle members 7 and 7a respectively, which together form guide ways of V shaped form at top and bottom. Blocks 8 and 9 shaped to fit the ways of beams 1 and 2 respectively are slidable therein, the arrangement of the angle members 7 taking the thrust of the blocks in all directions without binding. The blocks are mounted on pivot pins 10 which project laterally inward from and are rigidly mounted on side arms 11 which form the loader boom. One pin 10 on each boom is adjacent the rear end of the boom, while the other pin is spaced therefrom so that when the arm is horizontal said one pin is adjacent the rear end of the corresponding beam 1, as shown in Fig. 1. The arms 11 turn down toward their forward end and at such end are suitably connected. Plates 12 on the arms at their upper end are concentric with and normally engage the back of a bucket 13 which is hingedly connected at the bottom and back to arms 11 at the lowermost point thereon as at 14. The bucket is positioned and shaped so that when arms 11 are in their lowest and horizontal position, the bottom of the bucket has a slight upward slope from the lip, and is somewhat below the level of the tracks as shown.

The bucket is normally prevented from tipping, to dump its load, by releasable catch hooks 15 pivoted on the arms back of the bucket and engaging elements 16 on the bucket on the top and back. The hooks are released by means of a lever 17 upstanding from the cross shaft 18 on which the hooks are mounted and to which lever a rearwardly extending pull rope 19 is applied.

To raise and lower the boom arms, I provide hydraulic cylinders 20, one on each side. These are pivoted at their lower end just back of beams 2 on supports 21 which extend across and above the tracks and are supported from the frame members M by struts 22 secured on and upstanding from members M on opposite sides of the track. The piston rods 23 which project from the cylinders are pivotally connected to the upper end of A-frame units 24 which are rigid with and project upwardly from arms 11 intermediate their ends, the cylinders and rods being of course laterally out from said arms and extending at an acute forward angle to a vertical plane when the rear portions of arms 11 are horizontal.

By reason of the above arrangements of parts, it will be seen that when fluid is admitted to the cylinders to advance the piston rods, a lifting pressure will be applied to the arms 11, causing blocks 9 to slide up the ways 7a in vertical beams 2, and the blocks 8 to slide forwardly in ways 7 of horizontal beams 1. As a result the bucket is of course lifted, the extent of lift possible being such that the normally down-turned front end portion of arms 11 is substantially horizontal, as is the bucket, and is at such a height as to clear the body of a dump truck disposed thereunder. A pull on rope 19 will then release the bucket and allow the same to swing down to a dumping position as indicated in dotted lines in Fig. 2. Such swinging movement is yieldably limited by a spring and chain linkage 25 connecting the bucket and boom above the hinge 14. The bucket remains swung until it again comes in contact with the ground upon lowering of the boom, which causes catch hooks 15 to re-engage elements 16.

The cylinders are supported from the truck frames for convenience of assembly, and to prevent relative tilting of the trucks from tending to warp or strain the boom arms, due to the connection of the latter with the cylinders, connecting conduits 26 extend directly between the cylinders at top and bottom; branch conduits 27 extending from said conduits intermediate their ends to the control valve 28, as indicated in Fig. 5. In this manner, the fluid in the cylinders is self-equalizing, and can flow from one to the other without any valve manipulation if one cylinder is raised relative to the other with corresponding truck movements. This of course prevents any unequal pressure being applied to the boom arms which would tend to warp or strain either the arms or the cylinder mountings.

In the embodiment shown in Figs. 6 and 7, the cylinders 20 are pivoted on the supports 21 for cylinders 20 are shifted forwardly so that the adjacent cylinder pivots are in central alinement with the upright beams 2.

The A-frames 24 are eliminated, and the piston rods 23 are connected to the upper end of links 29. These links are vertical and parallel to beams 2, and are disposed between said beams and the cylinders laterally out from the boom arms 11, being pivoted on the latter in common with the pivotal mounting pins 10 of the vertically movable slide blocks 9 of said arms. The links are maintained in a perpendicular plane at all times by means of rollers 30 engaging the links on opposite sides and mounted on a crossbeam 31 which connects beams 2 at the top.

With this arrangement, the cylinders remain vertical throughout the stroke of the piston rods, and a greater lift of the boom arms is possible than with the first described structure; since no counteracting pressure in a rearward direction, tending to slide the boom arms rearwardly and lower said arms, is developed.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A front-end loader for a tractor, comprising spaced side arms, a bucket carried by the arms at their forward end and a mounting and operating means for the side arms comprising, as a unit for each arm, a straight substantially vertical track and a straight substantially horizontal track extending rearwardly from the vertical track adjacent the lower end thereof, the units being adapted to be mounted on the tractor; blocks slidable along the tracks, means pivotally mounting the vertical track blocks on the corresponding arm intermediate its ends, means pivotally mounting the horizontal track blocks on the corresponding arm adjacent its rear end, and means to apply a lifting pressure to the arms intermediate the ends thereof.

2. A front-end loader for a tractor of the endless track type having a main frame structure and endless track trucks supported therefrom, said loader comprising spaced side arms, a bucket carried by the arms at their forward end, mounting means for the arms adapted to be mounted on the frame structure of the tractor and cooperating with the arms to enable the latter to be raised and lowered at their forward end, and means adapted to be supported from the trucks of the tractor to apply an equalized lifting pressure to the arms.

3. A structure as in claim 2, in which said last named means includes hydraulic cylinders, and fluid equalizing conduits connecting the cylinders.

4. In combination, a supporting structure including a vertical track and a horizontal track projecting therefrom near its lower end, a boom arm, elements pivoted on the arm and slidably engaging the tracks, a link pivoted at its lower end in connection with the pivot of the element of the vertical track, and a hydraulic operating unit including a cylinder mounted at its lower end in fixed connection with the supporting structure and a piston rod projecting from the upper end of the cylinder and connected to the upper end of the link.

5. A device as in claim 4, in which the cylinder is vertical and centrally alined with the vertical track.

6. A device as in claim 4, with rollers mounted in fixed connection with the vertical track above the top limit of movement of the corresponding arm element and engaging the link on opposite sides.

7. A front end loader for a tractor, comprising spaced side arms, a bucket carried by the arms at their forward end, a mounting and operating unit for each arm, each unit being adapted to be mounted on the tractor and including an upstanding track, another track extending rearwardly from the lower portion of the upstanding track, an element slidable along each track, means pivotally mounting the elements on the corresponding arm at spaced points on the latter, and means to apply a lifting pressure to the arms; said pressure applying means comprising upstanding hydraulic cylinders adapted at their lower end to be pivoted on the tractor laterally out from the side arms and vertical tracks and adjacent the latter, and piston rods projecting from the upper end of the cylinders to a point above corresponding arms, and means operatively connecting the upper ends of said rods with the arms intermediate the ends of the latter.

8. A front end loader for a tractor, comprising spaced side arms, a bucket carried by the arms at their forward end, and mounting and operating means for the side arms comprising, as a unit for each arm, a substantially vertical track and a substantially horizontal track extending rearwardly from the vertical track adjacent the lower end thereof, the units being adapted to be mounted on the tractor, elements slidable along the tracks, means pivotally mounting the vertical track elements on the corresponding arms intermediate their ends, means pivotally mounting the horizontal track elements on the corresponding arms adjacent their rear end, hydraulic cylinders adapted to be pivoted at their lower end on the tractor laterally out from the side arms, said cylinders upstanding adjacent the vertical tracks, piston rods projecting up from the cylinders to a termination at their upper ends above the side arms, and lifting elements connected between the upper ends of said piston rods and the side arms intermediate the ends of the latter.

9. A front end loader as in claim 8 adapted to be mounted in connection with an endless track tractor which includes a main frame, and trucks for the endless tracks; said hydraulic cylinders at their lower ends being pivotally connected with and supported by said trucks.

ALBERT G. GURRIES.